United States Patent
Leedberg et al.

(10) Patent No.: US 8,655,954 B2
(45) Date of Patent: Feb. 18, 2014

(54) SYSTEM AND METHOD FOR COLLABORATIVE MESSAGING AND DATA DISTRIBUTION

(75) Inventors: Gregory Leedberg, Milton, MA (US); Kenneth D. Carey, Boston, MA (US); George W. Spencer, Jr., Westborough, MA (US)

(73) Assignee: Raytheon Company, Waltham, MA (US)

(*) Notice: Subject to any disclaimer, the term of this patent is extended or adjusted under 35 U.S.C. 154(b) by 96 days.

(21) Appl. No.: 12/468,101

(22) Filed: May 19, 2009

(65) Prior Publication Data

US 2009/0292773 A1    Nov. 26, 2009

Related U.S. Application Data

(60) Provisional application No. 61/128,329, filed on May 20, 2008.

(51) Int. Cl.
*G06F 15/16* (2006.01)

(52) U.S. Cl.
USPC ............ 709/205; 709/204; 709/223; 715/201

(58) Field of Classification Search
USPC .................................. 709/205–207
See application file for complete search history.

(56) References Cited

U.S. PATENT DOCUMENTS

| | | |
|---|---|---|
| 5,086,394 A | 2/1992 | Shapira |
| 5,619,648 A | 4/1997 | Canale et al. |
| 5,704,017 A | 12/1997 | Heckerman et al. |
| 6,073,142 A | 6/2000 | Geiger et al. |
| 6,101,531 A | 8/2000 | Eggleston et al. |
| 6,157,915 A | 12/2000 | Bhaskaran et al. |
| 6,330,610 B1 | 12/2001 | Docter et al. |
| 6,336,134 B1 | 1/2002 | Varma |
| 6,643,705 B1 | 11/2003 | Wallace et al. |
| 6,778,941 B1 | 8/2004 | Worrell et al. |
| 6,832,245 B1 | 12/2004 | Isaacs et al. |
| 6,886,169 B2 | 4/2005 | Wei |
| 6,968,179 B1 | 11/2005 | De Vries |
| 7,152,111 B2 | 12/2006 | Allred et al. |
| 7,185,057 B2 | 2/2007 | Brown et al. |
| 7,200,638 B2 | 4/2007 | Lake |

(Continued)

FOREIGN PATENT DOCUMENTS

| | | |
|---|---|---|
| EP | 1 193 925 A2 | 4/2002 |
| EP | 1 193 925 A3 | 4/2002 |

(Continued)

OTHER PUBLICATIONS

Notification of transmittal of the International Search Report dated Jun. 15, 2010, PCT/US09/44453.

(Continued)

*Primary Examiner* — Hua Fan
(74) *Attorney, Agent, or Firm* — Daly, Crowley, Mofford & Durkee, LLP

(57) ABSTRACT

A collaborative messaging and data distribution system includes a text-messaging engine executing on a processor for sending and receiving messages among a plurality of users. The text-messaging engine includes an information proxy for distributing information among at least one information source and the plurality of users. The information proxy appears as one of the plurality of users.

13 Claims, 5 Drawing Sheets

(56) References Cited

U.S. PATENT DOCUMENTS

| | | | |
|---|---|---|---|
| 7,249,162 B2 | 7/2007 | Rounthwaite et al. | |
| 7,299,264 B2 | 11/2007 | Yang-Huffman | |
| 7,343,564 B2 | 3/2008 | Othmer | |
| 7,363,319 B2 | 4/2008 | Cappellini | |
| 7,369,505 B2 | 5/2008 | Mengerink | |
| 7,370,283 B2 | 5/2008 | Othmer | |
| 7,383,307 B2 | 6/2008 | Kirkland et al. | |
| 7,430,724 B2 | 9/2008 | Othmer | |
| 7,437,408 B2 | 10/2008 | Schwartz et al. | |
| 7,441,203 B2 | 10/2008 | Othmer et al. | |
| 7,511,634 B2 | 3/2009 | Stehle et al. | |
| 7,512,569 B2 | 3/2009 | Isaacs | |
| 7,523,137 B2 | 4/2009 | Kass et al. | |
| 7,523,226 B2 | 4/2009 | Anderson et al. | |
| 7,526,573 B2 | 4/2009 | Busey | |
| 7,574,170 B2 | 8/2009 | Jendbro | |
| 7,574,479 B2 | 8/2009 | Morris et al. | |
| 7,581,166 B2 | 8/2009 | Renger et al. | |
| 7,590,691 B2 | 9/2009 | Gonsalves et al. | |
| 7,603,437 B2 | 10/2009 | Busey | |
| 7,680,890 B1 | 3/2010 | Lin | |
| 7,970,814 B2 | 6/2011 | Leedberg et al. | |
| 2001/0046069 A1 | 11/2001 | Jones | |
| 2002/0083127 A1 | 6/2002 | Agrawal | |
| 2005/0055403 A1 | 3/2005 | Brittan | |
| 2005/0132056 A1 | 6/2005 | Creamer et al. | |
| 2005/0193062 A1* | 9/2005 | Komine et al. | 709/204 |
| 2005/0234928 A1 | 10/2005 | Shkvarchuk | |
| 2005/0250552 A1 | 11/2005 | Eagle et al. | |
| 2005/0267974 A1 | 12/2005 | Panasyuk et al. | |
| 2005/0273503 A1 | 12/2005 | Carr et al. | |
| 2006/0036695 A1* | 2/2006 | Rolnik | 709/206 |
| 2006/0073812 A1 | 4/2006 | Venkata | |
| 2006/0133385 A1 | 6/2006 | Trossen et al. | |
| 2006/0173985 A1 | 8/2006 | Moore | |
| 2006/0230021 A1 | 10/2006 | Diab et al. | |
| 2006/0259474 A1 | 11/2006 | Granito | |
| 2006/0265489 A1 | 11/2006 | Moore | |
| 2007/0043617 A1* | 2/2007 | Stein et al. | 705/14 |
| 2007/0083536 A1 | 4/2007 | Darnell et al. | |
| 2007/0083894 A1 | 4/2007 | Gonsalves et al. | |
| 2007/0100836 A1 | 5/2007 | Eichstaedt et al. | |
| 2007/0100959 A1 | 5/2007 | Eichstaedt et al. | |
| 2007/0100960 A1 | 5/2007 | Eichstaedt et al. | |
| 2007/0130158 A1 | 6/2007 | LaBiche et al. | |
| 2007/0162432 A1 | 7/2007 | Armstrong et al. | |
| 2007/0162560 A1 | 7/2007 | Jin | |
| 2007/0168461 A1* | 7/2007 | Moore | 709/217 |
| 2007/0174389 A1 | 7/2007 | Armstrong et al. | |
| 2007/0203977 A1 | 8/2007 | Wu et al. | |
| 2007/0225047 A1 | 9/2007 | Bakos | |
| 2008/0010353 A1 | 1/2008 | Rounthwaite et al. | |
| 2008/0046369 A1 | 2/2008 | Wood | |
| 2008/0059964 A1 | 3/2008 | Khodabakchian et al. | |
| 2008/0104226 A1 | 5/2008 | Seshasai | |
| 2008/0104520 A1 | 5/2008 | Swenson et al. | |
| 2008/0126476 A1 | 5/2008 | Nicholas et al. | |
| 2008/0208972 A1 | 8/2008 | Chou et al. | |
| 2009/0061925 A1 | 3/2009 | Finkelstein et al. | |
| 2009/0070419 A1 | 3/2009 | Gilfix et al. | |
| 2009/0089380 A1 | 4/2009 | Wang et al. | |
| 2009/0172773 A1 | 7/2009 | Moore | |
| 2009/0248729 A1 | 10/2009 | Bruno, Jr. et al. | |

FOREIGN PATENT DOCUMENTS

| | | |
|---|---|---|
| EP | 1 209 849 B1 | 3/2007 |
| EP | 1 883 019 A1 | 1/2008 |
| GB | 2 313 524 A | 11/1997 |
| WO | WO 01/98856 A2 | 12/2001 |
| WO | WO 01/98856 A3 | 12/2001 |
| WO | WO 2004/031976 A1 | 4/2004 |
| WO | WO 2005/083934 A1 | 9/2005 |
| WO | WO 2005/121991 A2 | 12/2005 |
| WO | WO 2005/125070 A2 | 12/2005 |
| WO | WO 2005/125070 A3 | 12/2005 |
| WO | WO 2006/088952 A2 | 8/2006 |
| WO | WO 2006/088952 A3 | 8/2006 |
| WO | WO 2007/147207 A1 | 12/2007 |

OTHER PUBLICATIONS

Written Opinion of the International Searching Authority dated Jun. 15, 2010, PCT/US09/44453.
Notification Concerning Transmittal of the International Preliminary Report on Patentability (Chapter 1 of the Patent Cooperation Treaty), PCT/US2009/044453, date of mailing Dec. 2, 2010, 2 pages.
Written Opinion of the International Searching Authority, PCT/US2009/044453, date of mailing Jun. 15, 2010 4 pages.
Notification Concerning Transmittal of International Preliminary Report on Patentability (Chapter 1 of the Patent Cooperation Treaty), PCT/US2009/044450, date of mailing Dec. 2, 2010, 2 pages.
Written Opinion of the International Searching Authority, PCT/US2009/044450, date of mailing Dec. 2, 2010, 5 pages.
Notification of Transmittal of the International Search Report and the Written Opinion of the International Searching Authority, or the Declaration, PCT/US2009/044450 dated Oct. 6, 2009, 3 pages.
International Search Report Form PCT/ISA/210, PCT/US2009/044450 dated Oct. 6, 2009, 4 pages.
Written Opinion of the International Searching Authority, PCT/US2009/044450 dated Oct. 6, 2009, 5 pages.
Notification Concerning Transmittal of International Preliminary Report on Patentability (Chapter 1 of the Patent Cooperation Treaty)/International Preliminary Report on Patentability, PCT/US2009/044451, date of mailing Dec. 2, 2010, 2 pages.
Written Opinion of the International Searching Authority, PCT/US2009/044451, date of mailing Dec. 2, 2010, 5 pages.
Notification of Transmittal of the International Search Report and the Written Opinion of the International Searching Authority, or the Declaration, PCT/US2009/044451 date of mailing Oct. 6, 2009, 3 pages.
International Search Report, Form PCT/ISA/210, PCT/US2009/044451 date of mailing Oct. 6, 2009, 4 pages.
Written Opinion of the International Searching Authority, PCT/US2009/044451 date of mailing Oct. 6, 2009, 6 pages.
Notification of Transmittal of the International Search Report and the Written Opinion of the International Searching Authority, or the Declaration, PCT/US2009/044454 dated Jul. 30, 2009, 3 pages.
International Search Report, PCT/US2009/044454 dated Jul. 30, 2009, 4 pages.
Written Opinion of the International Searching Authority, PCT/US2009/044454 dated Jul. 30, 2009, 9 pages.
Notification Concerning Transmittal of International Preliminary Report on Patentability (Chapter 1 of the Patent Cooperation Treaty), PCT/US2009/044454, date of mailing Dec. 2, 2010, 2 pages.
Written Opinion of the International Searching Authority, PCT/US2009/044454, date of mailing Dec. 2, 2010, 7 pages.
Notification of Transmittal of the International Search Report and the Written Opinion of the International Searching Authority, or the Declaration, PCT/US2009/044452, dated Aug. 12, 2009, 3 pages.
International Search Report, PCT/US2009/044452, dated Aug. 12, 2009, 4 pages.
Written Opinion of the International Searching Authority, PCT/US2009/044452, dated Aug. 12, 2009, 5 pages.
Notification Concerning Transmittal of the International Preliminary Report on Patentability (Chapter 1 of the Patent Cooperation Treaty)/International Preliminary Report on Patentability, PCT/US2009/044452, date of mailing Dec. 2, 2010, 2 pages.
U.S. Appl. No. 12/468,099, Gregory Leedberg, et al., filed May 19, 2009, 35 pages.
U.S. Appl. No. 12/468,100, Gregory Leedberg, et al., filed May 19, 2009, 31 pages.
U.S. Appl. No. 12/468,112, Gregory Leedberg, et al., filed May 19, 2009, 33 pages.
U.S. Appl. No. 12/468,116, Kenneth D. Carey, et al., filed May 19, 2009, 41 pages.

(56) References Cited

OTHER PUBLICATIONS

King et al.: "An alternative implementation of the reference monitor concept (military messaging, secure)" Proceedings of the Aerospace Computer Security Applications Conference. Orlando, Dec. 12-16, 1988; Washington, IEEE Comp. Soc.Press, US, vol. Conf. 4, Dec. 12, 1988, pp. 159-166, XP010014556. ISBN: 978-0-8186-0895-7, p. 160, right-hand column, line 25-line 39; p. 163, left-hand column, line 46-right-hand column, line 37.

"Love: Japanese Style", Yukari Iwatani, Wired Magazine Online, Jun. 11, 1998, 2 pages, http://www.wired.com/culture/lifestyle/news/1998/06/12899, last accessed Jan. 13, 2011.

"Social Serendipity", MIT Media Lab: Reality Mining, Mar. 9, 2009, 10 pages, http://reality.media.mit.edu/serendipity.php, last accessed Jan. 13, 2011.

Brok J. et al: "Enabling New Services by Exploiting Presence and Context Information in IMS", Bell Labs Technical Journal, Wiley, CA, US, vol. 4, No. 10, Jan. 1, 2006, pp. 83-100, XP001239288, ISSN: 1089-7089.

3GPP: "$3^{rd}$ Generation Partnership Project; Technical Specification Group Services and System Aspects; Presence Service; Architecture and functional description (release 6)", 3GPP TS 23.141 v. 6.1.0, (Dec. 2002) Technical Specification; $3^{rd}$ Generation Partnership Project (3GPP), Mobile Competence Centre; 650, Route Des Lucioles; F-06921 Sophia-Antipolis Cedex; France, vol. SA WG5, no. Sophia Antipolis, France; Jan. 20, 2003, Jan. 10, 2003, XP050295829, pp. 1-31.

Office Action dated Mar. 10, 2011 and response to Office Action filed Jun. 2, 2011 for U.S. Appl. No. 12/468,116, filed May 19, 2009.

U.S. Appl. No. 12/468,112, filed May 19, 2009.

U.S. Appl. No. 12/468,116, filed May 19, 2009.

Office Action dated Jan. 11, 2012; for U.S. Appl. No. 12/468,116; 24 pages.

Bottazzi et al.; "Context-Aware Middleware Solutions for Anytime and Anywhere Emergency Assistance to Elderly People;" IEEE Communications Magazine, Apr. 2006; 9 pages.

USPTO Office Action dated Sep. 8, 2011 for U.S. Appl. No. 12/468,116, 20 pages.

European Search Report, Supplementary European Search Report, European Search Opinion, 09751335.2-1858/2281387, PCT/US2009044453, dated Feb. 15, 2013, pp. 1-10.

* cited by examiner

SYSTEM AND METHOD FOR COLLABORATIVE MESSAGING AND DATA DISTRIBUTION

RELATED APPLICATIONS

This application claims the benefit of U.S. Provisional Application No. 61/128,329 filed May 20, 2008 under 35 U.S.C. §119(e) which application is hereby incorporated herein by reference in its entirety.

FIELD OF THE INVENTION

The subject matter described herein is generally related to collaborative messaging and data distribution and, in particular, to text-messaging services which leverage data distribution feeds to supply and share information among users.

BACKGROUND

As is known in the art, one popular data distribution protocol allowing users to subscribe to feeds of data is referred to as Really Simple Syndication (RSS). RSS is a group of data feed formats used to publish frequently updated information, including web logs (blogs), discussion forums, news headlines, audio and video content. RSS documents save information in eXtensible Markup Language (XML) format such as links, updated data, publishing dates, and/or authorship information.

Publishers may use RSS feeds to syndicate content automatically. Readers may subscribe to such feeds to obtain timely updates to information they desire, such as up-to-date stock information, news related to topics of interest, web discussion forums, etc. For example, users may subscribe to a RSS feed by activating a uniform resource locator (URL) for a link representing the RSS feed. The RSS reader checks the feed to view any updates.

Another type of data feed format known in the art is the Atom Syndication Format, which is an XML-based format for web-based data feeds. Paired with this is the Atom Publishing Protocol, which uses the hypertext transfer protocol (HTTP) to publish and automate web-based data feeds.

As is also known, eXtensible Messaging and Presence Protocol (XMPP) is a popular (and United States Department of Defense mandated) collaboration protocol, enabling users with differing chat clients to participate in instant messaging sessions. While RSS and XMPP are both popular protocols which provide different capabilities, there does not appear to be any attempts to integrate them together. Rather, prior work with RSS and XMPP has focused on expanding the functionality of each separately.

SUMMARY

In general overview, one may appreciate that the inventive concepts described herein may include a collaborative messaging and data distribution system that combines the features and benefits of text-messaging and data syndication. For example, in one embodiment, a system combines the eXtensible Messaging and Presence Protocol (XMPP) to support a text-messaging environment (e.g., a chat session) and Really Simple Syndication (RSS) for data syndication (e.g. a news feed) over the text-messaging environment.

An exemplary application using the system includes a text-messaging engine to support a chat session for sending and receiving text messages among a group of users. The system distributes RSS information to the users over the chat session. In particular, the RSS information appears as text messages to the users over the chat session. In this way, RSS publishing integrates seamlessly with text-messaging over the chat session.

Advantageously, such a system can allow users, such as persons responsible for mitigating the consequences of an event, to collaborative with each other by sharing desired and/or needed and/or necessary information related to a task-at-hand. The users can also receive (and in some instances can themselves update) RSS syndicated information to provide relevant and timely information. Such events can include, but are not limited to, acts of nature, power outages, train derailments, bioterrorism, and/or pandemic influenza outbreak. Still further, organizations and business may use the inventive concepts for product-oriented tasks, marketing efforts, etc.

In further configurations, the system publishes data feeds for RSS information sources to users and enables users to subscribe to the data feeds. The system distributes RSS information to subscribed users as text messages that appear in a chat session. Still further, users may provide updates to the data feed, and such updates may be distributed to other subscribed users as text messages and/or to the RSS information source.

In accordance with the systems, techniques, and concepts described herein, a collaborative messaging and data distribution system includes a text-messaging engine executing on a processor for sending and receiving messages among a plurality of users. The text-messaging engine includes an information proxy for distributing information among at least one information source and the plurality of users. The information proxy appears as one of the plurality of users.

In further embodiments, the system includes one or more of the following features: the information proxy is configured to distribute information over a chat session; the information proxy is configured to distribute information over the chat session in response to a request for the information from at least one of the plurality of users; at least a portion of the messages is associated with the distributed information; the information proxy includes at least one data feed comprising at least one data entry; the information proxy includes a publisher processor to publish at least one data feed for the at least one information source, a subscriber processor to allow at least one of the plurality of users to subscribe to the at least one data feed, and a distributor processor to distribute information associated with the at least one data feed to the at least one subscribed user, and; the distributor processor is configured to process at least one data update from the at least one subscribed user.

In another aspect of the systems, techniques, and concepts described herein, a method for collaborative messaging and data distribution includes, in a text-messaging engine executing on a processor, sending and receiving messages among a plurality of users, and in an information proxy, distributing information among at least one information source and the plurality of users, wherein the information proxy appears as one of the plurality of users.

In further embodiments, the method includes one or more of the following features: the information proxy is configured to distribute information over a chat session; distributing information over the chat session in response to a request for the information from at least one of the plurality of users; at least a portion of the messages is associated with the distributed information; the information proxy includes at least one data feed comprising at least one data entry; publishing to the plurality of users at least one data feed for the at least one information source, enabling at least one of the plurality of users to subscribe to the at least one data feed, and distributing information associated with the at least one data feed to the at least one subscribed user, and; distributing to the at least one data feed at least one data update from the at least one subscribed user.

In another aspect of the systems, techniques, and concepts described herein, an article includes a storage medium having stored instructions thereon that when executed by a machine result in the following: a text-messaging engine for sending and receiving messages among a plurality of users; and an information proxy for distributing information among at least one information source and the plurality of users, wherein the information proxy appears as one of the plurality of users.

In a further embodiment, the article includes publishing to the plurality of users at least one data feed for the at least one information source, enabling at least one of the plurality of users to subscribe to the at least one data feed, and distributing information associated with the at least one data feed to the at least one subscribed user.

BRIEF DESCRIPTION OF THE DRAWINGS

The foregoing features of this invention, as well as the invention itself, may be more fully understood from the following description of the drawings in which.

DETAILED DESCRIPTION

Figure 1:
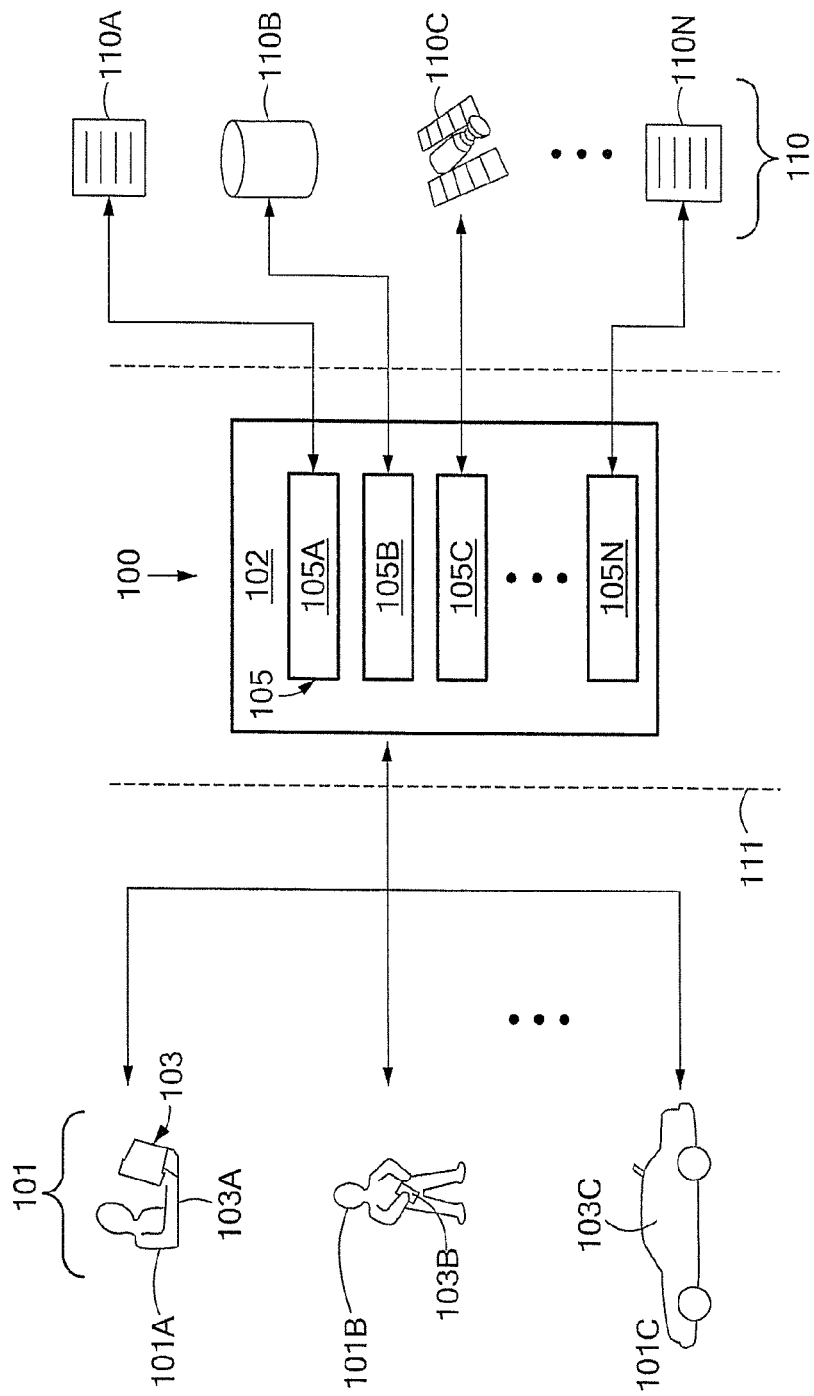
FIG. 1 is a block diagram of an embodiment of a collaborative messaging and data distribution system according to the invention.

Referring to FIG. 1, a collaborative message and data distribution system 100 (hereinafter referred to as the collaborative message system) includes a text-messaging engine 102 executing on a processor for sending and receiving messages among a plurality of users 101. The text-messaging engine 102 includes an information proxy 105 for distributing information among at least one information source 110 and the plurality of users 101. In one embodiment, an information proxy 105A distributes information as text messages from an information source 110A to at least one of the users 101 (i.e. at least one of user 101A, 101B-101N). In the same or different embodiment, users 101 update the information source 110A by sending text-messages via the information proxy 105A to the information source 110A.

It should be apparent to one skilled in the art that although the inventive concepts are described primarily with reference to a text-based messaging and distribution environment, information in a form other than (or in combination with) text may be distributed. For example, the text-messaging engine 102 may be a more generalized data distribution engine capable of sending and receiving audio, video, and other types of content. In some embodiments, an XML format may be used to standardize data distribution among various clients 103. Such an XML format may include XML tags and fields to indicate a source of an update, a time/date of the update, an update link, and/or an author of an update.

The information proxies 105 handle communications among users 101 and information sources 110. For example, the information proxies 105 provide and distribute information updates from the information sources 110 to the users 101. As will be described further, the information sources 110 may include various kinds of information sources including, but not limited to, news feeds, web-based forums, and event notifications.

In one embodiment, the information proxies 105 act as users logged into the text-messaging engine 102. This allows users 101 to seamlessly communicate with the information sources 110 via the information proxies 105 as if the information sources were other text-messaging engine users. For example, users 100 may send commands to the information sources 110 and receive text messages from the information sources 110 within a familiar text-messaging environment.

In one embodiment, the information proxies 105 distribute information from information sources 110 over a chat session executing within the text-messaging engine 102. In this embodiment, the chat session may involve a first and a second user and one or more of the information proxies 105. The first and second users send text messages to each other, as well as view text messages from the one or more information proxies 105. Users 101 may view the text messages on chat screens executing on client devices 103.

In an exemplary environment incorporating the collaborative message system 100, one or more information proxies 105 may be configured to distribute information from the one or more information sources 110. For example, a collaborative message system administrator may configure a first and a second information proxy 105A, 105B by defining data source links to respective information sources 110A, 110B. Such links enable the first and second information proxies 105A, 105B to receive and/or respond to and/or process updates for respective information sources 110A, 110B.

For example, in one embodiment, the information sources 110 push updates to the information proxies 105 using a uniform resource locator (URL) to send HTTP requests to the information proxies 105 on a server. Here, the HTTP requests may include a text update string concatenated to the request. In still another embodiment, information proxies 105 pull updates from information sources 110 by requesting the updates. Such updates may be saved in a shared memory that the information sources 110 may write to and information proxies 105 may read from. Such push and/or pull of updates may be executed at timed intervals, for example, every second, minute, etc. In other embodiments, the updates may be event-driven, such as when a news syndicate updates a news feed.

During operation of the collaborative message system 100, information sources 110 may be "published" which, in one embodiment, includes sending a list of the information sources 110 to users 101 (i.e. information sources as may include information sources 110A, 110B, 110C-110N), as for example to client devices 103. The users 101 may subscribe to one or more of the information sources 110 to receive data. In one embodiment, users 101 subscribe to one or more of the information sources 110 by selecting each from a list of information sources displayed on the client devices 103. In response to a user selection, the client devices 103 send subscription requests to the text-messaging engine 102, which forwards the requests to respective information proxies 105. The information proxies 105 add users to a list of subscribed users and automatically send any updates from the information sources 110 to the subscribed users. In a further embodiment, subscription requests include unique client device identifiers and/or user information so that the information proxies 105 can send updates to the correct client devices 103.

As described above, the information proxies 105 distribute information from the respective information sources 110 to the subscribed users 101. As non-limiting examples, information updates can include those originating from the information source itself, for example, an updated cycle of a news feed, and those originating from one or more of the users 101, such as updated news from a user at the scene of an accident. In one example application, the information proxies 105 distribute the updates as text messages which appear on client devices 103 where users 101 may view the updates. In a further embodiment, information sources 110 may be updated by the users 101. For example, a user 101A can input an update to information source 110A on a client device 103A. The client device 103A can send the update as text message to the text-messaging engine 102, which forwards the update to the information proxy 105A for distributing the information (and updates) for information source 110A. The information proxy 105A distributes the user update to other users subscribed to the information source 110A.

In a still a further embodiment, the information proxy 105A performs update validation and/or confirmation. For example, the information proxy 105A may ensure that user 101A provides the text message update is in a proper format for the information source 110A. For example, the information proxy 105A may truncate characters from the inputted text message for length limited fields of the information source 110A. Such validation is useful for information sources 110 that are in a database format which may include length-limited text fields. Still further, such validation can include validating proper data types and/or converting to a proper data type format, such as converting text to a floating point value. In still another embodiment, validation can include range validation. For example, an update may be out-of-range of a predefined range of alert levels, in which case the information proxy 105A can modify the update appropriately.

Advantageously, such a system 100 can seamlessly combine the features and benefits provided by text messaging and data syndication services. For example, the system 100 can leverage the collaborative features found in text-messaging services, such as those using XMPP, with data distribution features found in data syndication services, such as those using the RSS or the Atom format. Users 101 can interact with information sources 110 via information proxies 105 in the same or similar manner as any other user. As initial step, users 101 may subscribe to the information source 110A so that they may receive information from the information source 110A. Still further, users 101 may receive a listing of published information sources 110 so that they may choose to subscribe to one or more of the published information sources 110.

In one embodiment, users 101 send and receive text messages on client devices 103 in communication with the text-based messaging engine 102 over a network 111. For example, a first user 101A may use a desktop computer 103A to send and receive text messages, a second user 101B may use a hand-held device 103B, such as personal data assistant and/or cellular phone, and a third user 103C may use a panel-mounted computer installed in an automobile. These devices may provide various levels of functionality and text-messaging support, for example, the desktop computer 103A may include a sophisticated text message composer that includes formatting options, whereas the hand-held device 103B may be limited to plain text inputted using a small keypad. Other possible methods for text input include, but are not limited to, voice activation, touch-tone alphanumeric keypads, and scan-to-text devices.

Network 111 includes, but is not limited to, the Internet, an intranet, or other type of network. The network may include a wireless network operating alone or in combination with wired networks. Such a network 111 may enable cellular phone usage and/or Bluetooth® device usage.

In one embodiment, the text-messaging engine 102 includes multiple information proxies (i.e. 105A, 105B, 105C-105N) connected to multiple information sources (i.e. 110A, 110B, 110C-110N, respectively). The information sources 110 may include various types of data including, but not limited to, a RSS news feed 110A (e.g. a syndicated news feed, such as one supplied by the New York Times), a database feed 110B (e.g., a geo-spatial database including place names and positional information), external instrumentation 110C (e.g., a weather tracking system for storm tracking and/or spotting weather-related events), and/or another data source 110N (e.g., a Department of Homeland Security data feed including alerts related to a terrorist incident).

Figure 2:
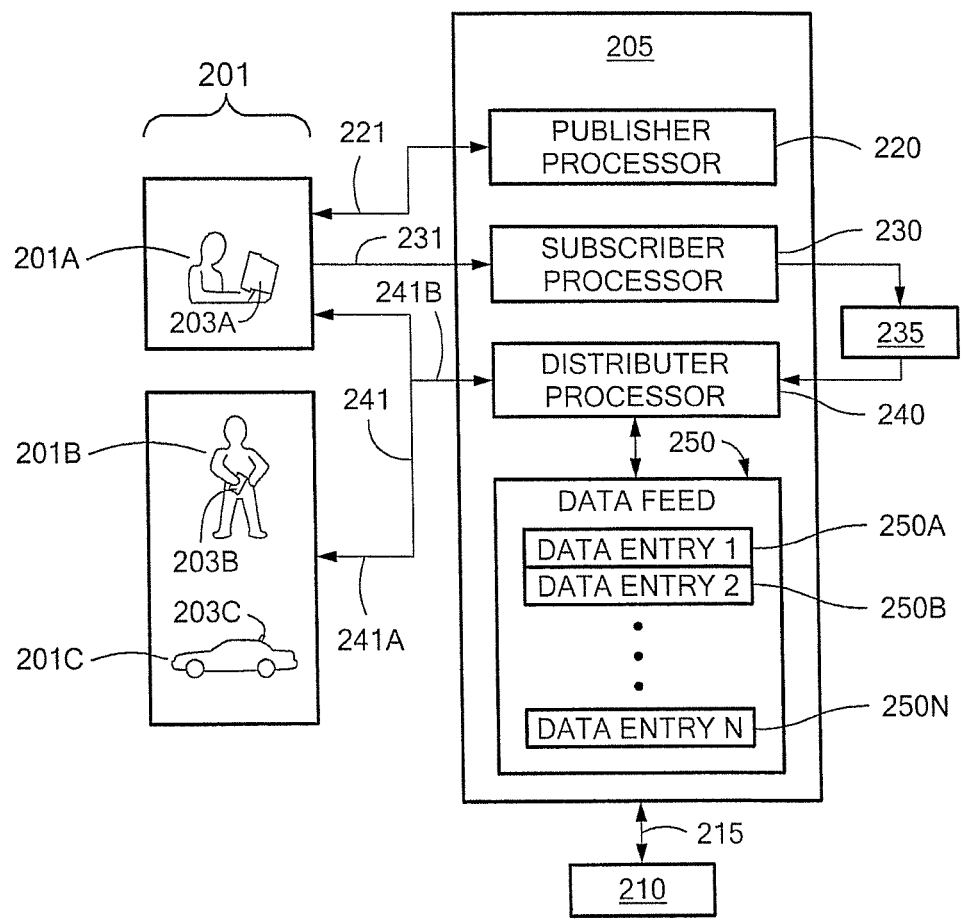
FIG. 2 is a block diagram of an embodiment of an information proxy according to the invention.

Referring now to FIG. 2, a further embodiment of an information proxy 205, as may be similar to one or more of the information proxies 105 described in conjunction with the collaborative messaging system 100 of FIG. 1, includes a publisher processor 220 to publish a data feed 250 for an information source 210, as may be similar to one of the information sources 110 described in conjunction with FIG. 1, a subscriber processor 230 to allow users 201 to subscribe to the data feed 250, and a distributor processor 240 to distribute the data feed information (i.e. 250A, 250B-250N) to subscriber users. In some instances, the data feed 250 is linked to an information source 210 via a link 215.

In one embodiment, the link 215 is a data source object representing the information source 210. The data source object includes an information source type (including, but not limited to, a RSS feed, database), a connection string, and credentials.

In one embodiment, the data feed 250 includes one or more data entries 250A, 250B-250N which include data processed by the information proxy 205. The data entries 250A, 250B-250N may include updated information from the information source 210 to be distributed to users subscribed to the data feed 205 and/or updated information from users 201 to be distributed to the subscribed data feed users.

In one embodiment, as an initial step in the operation of an information proxy 205, an administrator user having special access privileges to the information proxy 205 and/or an information source 210 creates a link 215 between the information proxy 205 and an information source 210. For example, the administrator user may create a link with a name and specific RSS feed for the information source. The RSS feed may require access credentials, such as a username and password, which the administrator may provide.

In a further embodiment, the link 215 is automatically defined. For example, a collaborative message system may scan a network for information sources and for each discovered information source, defines a new information proxy 205 and a link 215 between the new information proxy 205 and the discovered information source 210. In still another embodiment, the collaborative message system receives a list of information sources and creates a new information proxy and a link for each listed information source.

It will be understood that links 215 may be established dynamically during collaborative messaging system operation as new information sources become available. For example, new information sources may become available as events unfold in a context and persons involved in the context desire and/or need new information in order to mitigate the consequence of an event, or perform a task at hand.

In one example application context incorporating the inventive concepts, a law enforcement officer arrives at the scene of a multi-vehicle car crash and sends text messages regarding the circumstances of the crash to a local dispatcher using the collaborative message system and a client device. The law enforcement officer learns that one of the victims was robbed in the aftermath of the crash and obtains descriptive information of the perpetrator from eye-witnesses. After sending the descriptive information of the perpetrator to the local dispatcher, the local dispatcher creates a data feed 250 for an information source 210 for an All Points Bulletin (APB). This creates an information proxy 205 and a link 215 between the information proxy and the APB information source. In one embodiment, the information source 210 is also created during this process, however, in other embodiments, the information source 210 may be a preexisting database, data file, or RSS feed.

The local dispatcher enters the descriptive information as a text message and sends it to the APB information source via the information proxy data feed 210. The APB information is sent to other law enforcement officers in the area using the collaborative message system. In particular, the other law enforcement officers may receive and view the APB information from the information source as text messages received on dashboard-mounted computers in their squad cars.

In the same or different embodiment, a publisher processor 220 publishes information to users 201 regarding available data feeds. For example, the publisher processor 220 can publish the data feed 250 to a user 201A. The user 201A may view the published data feed on a desktop computer 203A. In one embodiment, the published data feed includes a description of the data feed 205 sent to the user 201A (as designated by reference numeral 221), as for example over a network. In the same or different embodiment, the user 201A views the description in a client program, such as a web browser, executing on the desktop computer 203A. The published data feed may be sent to users 201 automatically or at the request of the users 201. For example, the published data feed information may sent via HTTP.

The user 201A can choose to obtain information from the data feed 250 by subscribing to the data feed 250. For example, the user 201A can select the data feed description information and issue a request to subscribe to the data feed 250 to the subscriber processor 230 (as designated by reference numeral 231). In response, the subscriber processor 230 can add the user 201A to a list of subscribed users 235. In one embodiment, each subscribed user is represented by a unique client device identifier that indicates to the information proxy 205 where to send data feed information. For example, a network capable client device may include a network interface controller (NIC). The NIC has a read-only memory chip that has a unique Multiple Access Control (MAC) address burned or engraved into it, which may serve as the unique client device identifier.

The distributor processor 240 sends data feed information 241 to users 201 defined in the subscriber list 235. It should be noted that the subscriber list 235 may be empty, as may be the case at the beginning of an incident when the collaborative messaging system is still coming online. In one embodiment, the data feed 250 includes updated information from the information source 210. For example, a first data entry 250A may represent a first information update originating from the information source 210. The distributor processor 240 sends the first data entry 250A to the subscribed users 235 (designated by 241A). In the same or different embodiment, a second data entry 250B represents an information update originating from one of the users 201. The distributor processor 240 sends the second data entry 250B to the subscribed users 235.

Referring again to FIG. 2, operations of the above-mentioned information proxy 205 including the publisher processor 220, subscriber processor 230, distributor processor 240, and data feed 250 will now be described in more detail. In an example application incorporating the inventive concepts described herein, law enforcement personnel communicate with each other using a collaborative message system, as may be similar to the collaborative message system 100 described in conjunction with FIG. 1. In the above example involving the APB information source related to a multi-vehicle car crash, the local dispatcher 201A can use a desktop computer 203A to send an APB message to a local area police patrol 201C. The message informs the patrol 201C that a perpetrator is at large. The local police patrol 201C requests a list of published data feeds from the publisher processor 220, for example, by issuing a HTTP request for the information. Upon receiving the published data feeds, the local police patrol 201C subscribes to the APB data feed by selecting it and submitting a subscription request (which may also be via HTTP) to the subscriber processor 230. The request includes a unique client device identifier so that the information proxy 205 can determine where to send APB information to the local police patrol 201C. The subscriber processor 230 adds the local police patrol 201C to the list of APB data feed subscribers, which already includes the law enforcement officer 201B at the scene of the accident, as well as the local dispatcher 201A.

The distributor processor 240 sends descriptive information related to the perpetrator to the local police patrol 201C who views it on their client device 203C. As will be further described below in more detail, the APB data feed appears as a user of the collaborative messaging system. During further patrol of an area, the local police patrol 201C spots the perpetrator and sends a message to the local dispatcher 201A. They also send an update to the APB data feed to indicate, for example, where they spotted the perpetrator, time of the spotting, and/or updated appearance information, such as an estimate of the perpetrator's height and weight, gender, and clothing description. The distribute processor 240 receives the updated APB information and sends it to the other subscribed users.

Figure 3:
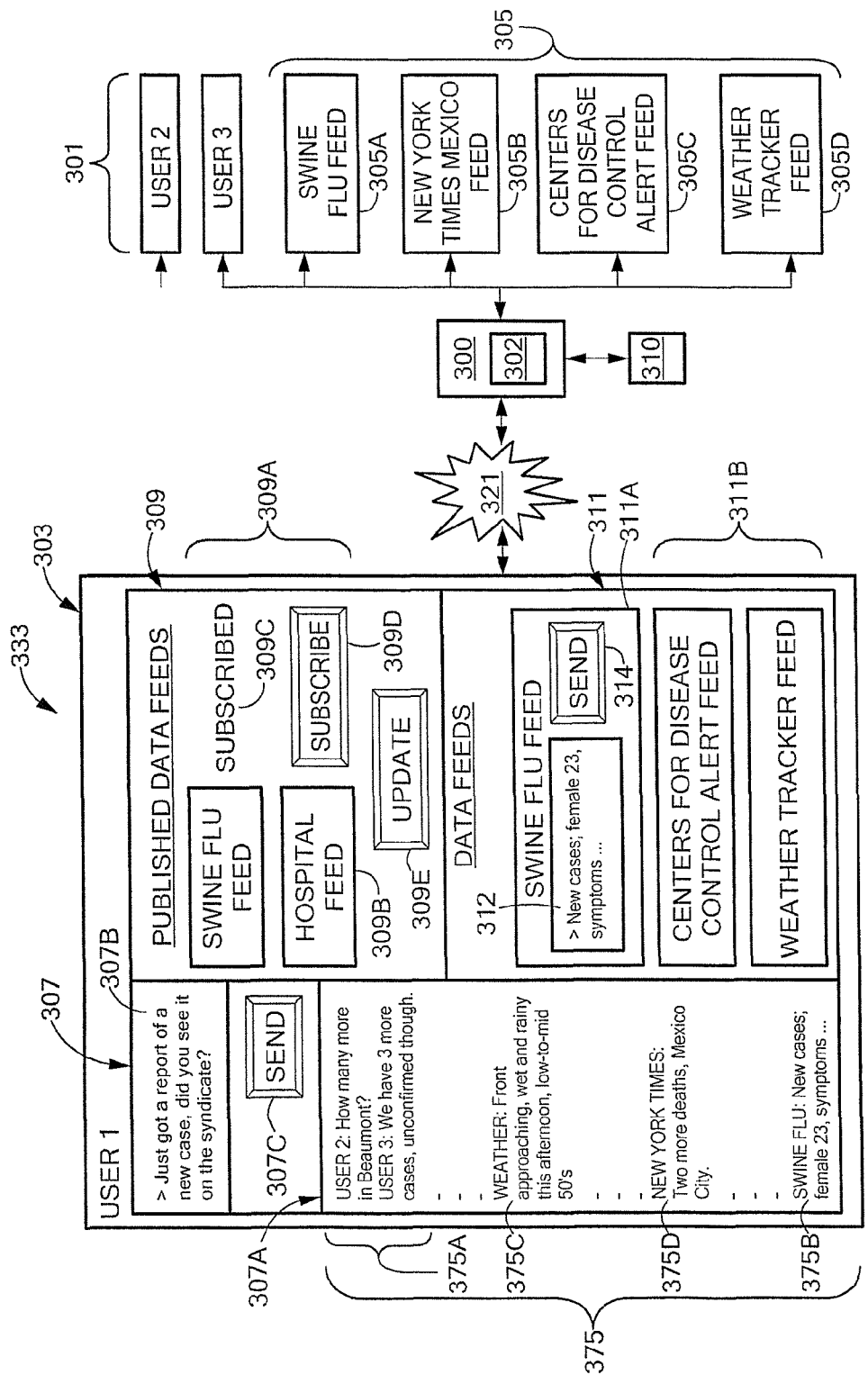
FIG. 3 is a pictorial representation of a client/server environment which may use the collaborative messaging system of FIG. 1.

Referring now to FIG. 3, an exemplary client/server environment uses a collaborative message system 300, as may be similar to the collaborative messaging system 100 described in conjunction with FIG. 1, including information sources generally denoted by reference numeral 310, and a plurality of users 301. In this particular example, a first user 301A (hereinafter referred to as USER 1), a second user 301B (hereinafter referred to as USER 2), and a third user 301C (hereinafter referred to as USER 3) send text messages (generally designated by reference numeral 375) to each other regarding an outbreak of the Swine Flu (H1N1 Flu). The users 301 use client devices (an example of which is designated by reference numeral 333) to send text messages over a network 321 to each other using the collaborative message system 300. USER 1, USER2, and USER 3 have subscribed to data feeds 305 which appear as users 301 of the collaborative messaging system 300, as will be further described below.

Client device 333 includes a client screen 303 including a text-messaging portion 307 for displaying text messages 375 among the users 301, a published data feed portion 309 for displaying published data feeds 305 which users 301 may subscribe to, and a subscribed data feed portion 311 for displaying the data feeds 305 to which a user (in this instance, USER 1) is currently subscribed. The client screen 303 may be implemented using an operating system that supports a user interface environment including, but not limited to, Microsoft Windows® manufactured by Microsoft Corporation of Redmond, Wash. Still further, the client screen 303 may be implemented in a web browser style program such as Internet Explorer® also manufactured by Microsoft Corporation. The client screen 303 may include a variety of user interface components such as text input boxes, message areas, and buttons.

The text-messaging portion 307 includes a text message display area 307A that displays text messages 375 received from other users (for example USER 2 and USER 3 as designated by reference numeral 375A) as well as those sent by USER 1. The text messages 375 are handled by a text-messaging engine 302, as may be similar to text-messaging engine 102 described in conjunction with FIG. 1. The text message portion 307 also includes a text message input box 307B to enable a user (here, USER 1) to input text messages 375 and a send button 307C to enable the user to send text messages 375 to other users 301.

As will be described further below, the text-messaging area 307A includes updates (375B, 375C, 375D) from one or more data feeds 305. The data feeds 305 appear as users 301 of the collaborative messaging system 300 in that the text message display area 307A displays the data feed updates (375B, 375C, 375D) as text messages 375, which appear to be messages from users 301. In such a way, the collaborative message system 300 can seamlessly integrate collaborative messaging and data distribution in one environment.

The published data feed portion 309 includes a listing 309A of published data feeds 305. In one embodiment, the published data feed information is provided by a publisher processor, as may be similar to publisher processor 220 described in conjunction with FIG. 2. In this example, a first data feed 305A is a Swine Flu data feed for distributing information regarding an outbreak of the Swine Flu which is being tracked not only by users 301, but by other agencies such as the Centers for Disease Control (CDC). Such Swine Flu information may include outbreak statistics, as well as incoming updates regarding newly reported Swine Flu case incidences. The incoming updates, for example, may include patient information and location information.

A second data feed 305B includes a New York Times data feed for tracking news from Mexico, where Swine Flu cases were first reported. For example, such information may include governmental actions to attempt to control the outbreak, such as public facility closings and quarantines. A third data feed 305C includes a CDC data feed for relating an alert level of the Swine Flu outbreak. A fourth data feed 305D includes a weather tracker data feed for distributing weather forecast information, which may be useful for users 301 who must travel as part of their outbreak response efforts.

The listing 309A of published data feeds 305 includes data feed descriptive information 309B and an indication 309C of whether a user is subscribed to the data feed 305. If a user is not subscribed, then a SUBSCRIBE button 309D may be included which when activated subscribes a user to the published data feed 305. In one embodiment, activating the subscribe button sends a request to a subscriber processor, as may be similar to subscriber processor 230 described in conjunction with FIG. 2, which processes the request, for example, by adding the user to a data feed subscriber list, as may be similar to subscriber list 235 described in conjunction with FIG. 2. In a further embodiment, the subscriber processor 230 checks classification levels of a requesting user to ensure that the user has permission to subscribe to a data feed 305 and view data feed information.

The subscribed data feed portion 311 includes a first portion 311A that displays information about one or more data feeds 305 that USER 1 may send updates to. For example, USER 1 may send text message updates to the Swine Flu data feed 305A. In one embodiment, a user enters text message updates in a text input area 312. The user may sends the update by activating a SEND button 314. Here, USER 1 reports a new incidence of the Swine Flu, including patient information, such as gender, age, and symptoms. In one embodiment, the text message update is sent to a distributor processor, as may be similar to distributor processor 240 described in conjunction with FIG. 2. The distributor processor forwards the message to other users in the subscriber list. For example, text message 375B corresponds to the update sent by USER 1.

The subscribed data feed portion 311 also includes a second portion 311B that lists other data feeds 305, which can referred to as "passive" data feeds that USER 1 may not send updates to but, of course, may view the updates. For example, updates to the New York Times data feed 305B and the weather tracker data feed 305D correspond to respective messages 375D and 375C.

It should noted, of course, that other exemplary environments may include user interface components and techniques for publishing data feeds, subscribing users, and posting updates other than those described above. As non-limiting examples, published data feeds may alternatively be sent to an administrator user who subscribes users to the data feeds. Still further, a user may choose from options that indicate whether to send a text message as a data feed update or as a text message from the user.

Figure 4:
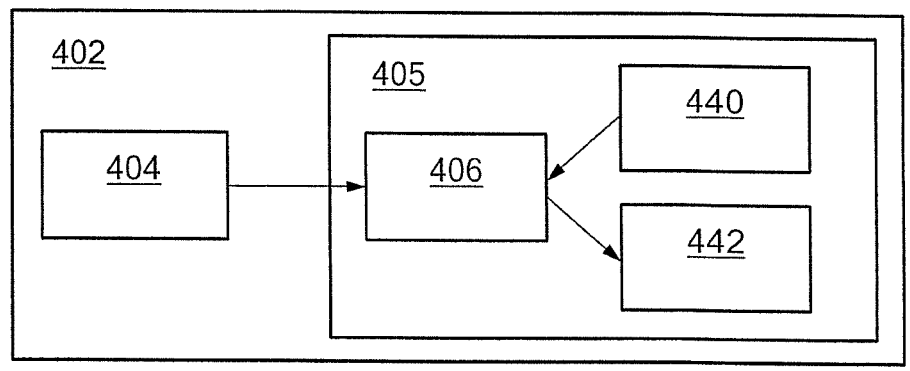
FIG. 4 is a flow diagram of an embodiment of a method of collaborative messaging and data distribution according to the invention.
Figure 4A:
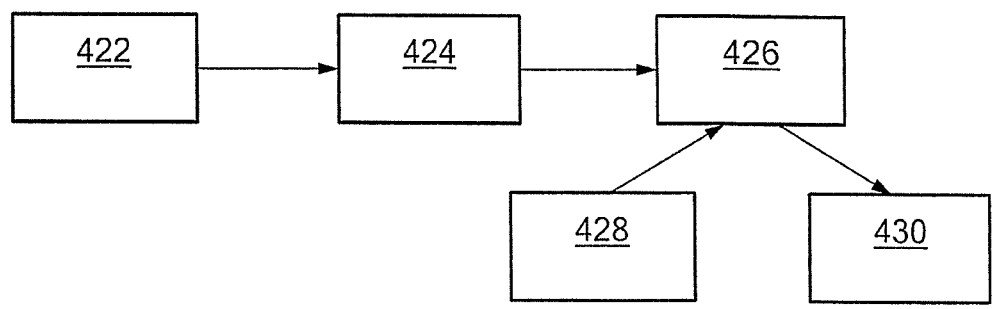
FIG. 4A is a flow diagram of a more detailed embodiment of the method of FIG. 4.

Referring now to FIG. 4, a method 400 for collaborative messaging and data distribution includes, in a text-message engine 402 executing on a processor, sending and receiving messages among a plurality of users (step 404) and, in an information proxy 405 included in the text-messaging engine 402, distributing information among at least one information source and the plurality users (step 406). In one embodiment, the information proxy 405 appears to the plurality of users as one of the users of the text-messaging engine 402.

In a further embodiment, the method 400 includes receiving information from the information source (step 440) and/or sending information updates from one or more users to the information source (step 442).

In another embodiment, the information proxy 405 includes a data feed for receiving the information from the information source and the method 400 further includes publishing the data feed to users (step 422), enabling users to subscribe to the data feed (step 424), and distributing information associated with the data feed to subscribed users (step 426).

In still a further embodiment, the method 400 includes distributing updates to the data feed received from users to subscribed data feed users (step 428) and/or sending the data feed updates to the information source 410 (step 430).

Figure 5:
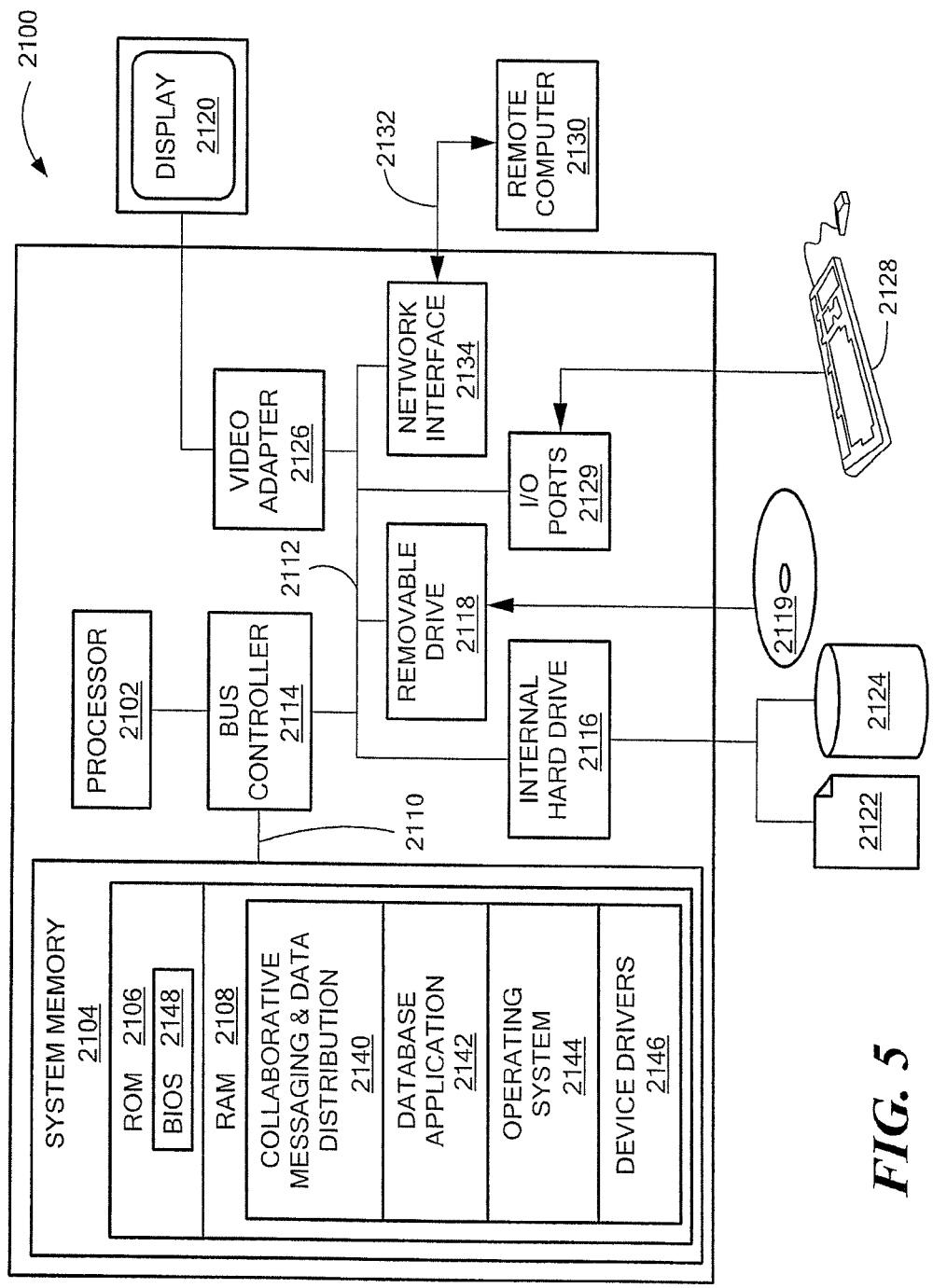
FIG. 5 is a diagram showing an exemplary hardware and operating environment of a suitable computer for use with embodiments of the invention.

FIG. 5 illustrates a computer 2100 suitable for supporting the operation of an embodiment of the collaborative messaging systems, concepts, and techniques described herein. The computer 2100 includes a processor 2102, for example, a dual-core processor, such as the AMD Athlon™ X2 Dual Core processor from the Advanced Micro Devices, Inc. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing the collaborative messaging and data distribution systems and methods described herein. In a further embodiment, the computer 2100 may execute various components of a text-messaging engine as may be similar to that described in conjunction with FIG. 1. In still a further embodiment, the text-messaging engine implements the components on different processors, for example, a first processor and a second processor. For example, the first processor implements a first information proxy, as may be similar to information proxy 105A described in conjunction with FIG. 1, and the second processor implements a second information proxy, as may be similar to information proxy 105B described in conjunction with FIG. 1. Advantageously, the division of processing function saves time and overhead and allows for asynchronous programming. For example, the first and second information proxies may distribute information from respective information sources independently of each other.

Furthermore, collaborative messaging system data may be saved in internal hard drive storage 2116, read-in from removable drive 2118, or received via the network 2132 from remote computer 2130, and loaded into RAM 2108. In a further embodiment, data entries, as may be similar to data entries 250A, 250B-250N described in conjunction with FIG. 2, are collected and stored in RAM 2108. Such data entries may be represented in data arrays and/or linked lists. Still further, subscribed user lists, as may be similar to subscriber user list 235 described in conjunction with FIG. 2, are collected and stored in RAM 2108. The data may be stored in a database format on hard drive storage 2116 to execute in a database application or in a file format, which can include, but is not limited to, a comma-delimited text file.

In a further embodiment, the first and second processors may be respective processors of a dual-core processor. Alternatively, the first and second processor may respective first and second computing devices. Output of the first and/or second processors may be rendered on display 2120.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A collaborative messaging and data distribution system, comprising:
   a microprocessor;
   a predetermined text-messaging centralized server engine executing on the microprocessor for sending and receiving messages among a plurality of users, each user involved in an event, the event characterized by a plurality of consequences associated with at least one of:

injuries to a person not included in the plurality of users, health problems of the person, or damage to property, comprising:
- an information proxy for receiving information from at least one data feed, the information including at least one data entry update related to the event and from sources other than the plurality of users, the predetermined text-messaging centralized server engine distributing the at least one data entry update among the plurality of users, wherein the predetermined text-messaging centralized server engine enables a chat session associated with a chat session window in which textual display of the at least one data entry update integrates with textual display of messages of the plurality of users such that the at least one data entry update appears as one of the user messages of the chat session.

2. The system of claim 1, wherein the information proxy is configured to distribute information over the chat session in response to a request for the information from at least one of the plurality of users.

3. The system of claim 1, wherein the information proxy comprises:
- a publisher processor to publish the at least one data feed;
- a subscriber processor to allow at least one of the plurality of users to subscribe to the at least one data feed; and
- a distributor processor to distribute information associated with the at least one data feed to the at least one subscribed user.

4. The system of claim 3, wherein the distributor processor is configured to process at least one user-lased data entry update based on information from the at least one subscribed user.

5. A method for collaborative messaging and data distribution, comprising:
- in a predetermined text-messaging centralized server engine executing on a processor:
  - sending and receiving messages among a plurality of users, each user involved in an event, the event characterized by a plurality of consequences associated with at least one of: injuries to a person not included in the plurality of users, health problems of the person, or damage to property; and
  - in an information proxy, receiving information from at least one date feed, the information including at least one data entry update related to the event and from sources other than the plurality of users, the predetermined text-messaging centralized server engine distributing the at least one date entry update among the plurality of users, wherein the predetermined text-messaging centralized server engine enables a chat session associated with a chat session window in which textual display of the at least one data entry update integrates with textual display of messages of the plurality of users such that the at least one data entry update appears as one of the user messages of the chat session.

6. The method of claim 5, further comprising distributing information over the chat session in response to a request for the information from at least one of the plurality of users.

7. The method of claim 5, further comprising:
- publishing to the plurality of users the at least one data feed;
- enabling at least one of the plurality of users to subscribe to the at least one data feed; and
- distributing information associated with the at least one data feed to the at least one subscribed user.

8. The method of claim 7, wherein distributing the at least one data entry update includes processing at least one user-based data entry update based on information from the at least one subscribed user.

9. An article, comprising:
- a non-transitory storage medium having stored instructions thereon that when executed by a machine result in the following:
  - a predetermined text-messaging centralized server engine for sending and receiving messages among a plurality of users, each user involved in an event, the event characterized by a plurality of consequences associated with at least one of: injuries to a person not included in the plurality of users, health problems of the person, or damage to property; and
  - an information proxy for receiving information from at least one data feed the information including at least one data entry update related to the event and from sources other than the plurality of users, the predetermined text-messaging centralized server engine distributing the at least one data entry update among the plurality of users, wherein the predetermined text-messaging centralized server engine enables a chat session associated with a chat session window in which textual display of the at least one data entry update integrates with textual display of messages of the plurality of users such that the at least one data entry update appears as one of the user messages of the chat session.

10. The article of claim 9, further comprising:
- publishing to the plurality of users the at least one data feed;
- enabling at least one of the plurality of users to subscribe to the at least one data feed; and
- distributing information associated with the at least one data feed to the at least one subscribed user.

11. The system of claim 10, wherein distributing the at least one data entry update includes processing at least one user-based data entry updated based on information from the at least one subscribed user.

12. The method of claim 9, further comprising distributing information over the chat session in response to a request for the information from at least one of the plurality of users.

13. The system of claim 1, wherein integrating the textual display of the at least one data entry update with the textual display of messages of the plurality of users includes displaying in the chat session window at least one line of data entry update text interdisposed with at least one line of user message text.

* * * * *